July 5, 1932.　　G. T. HUXFORD ET AL　　1,866,212
GRINDING MACHINE
Filed March 16, 1927　　8 Sheets-Sheet 3
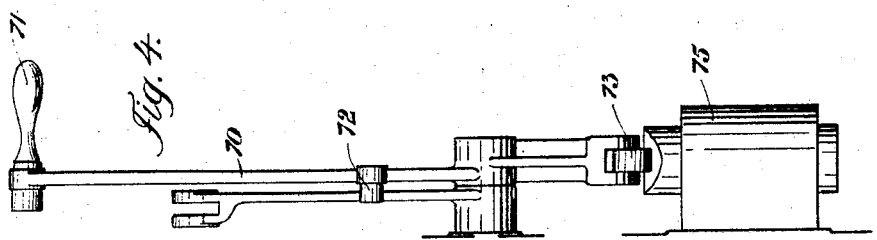
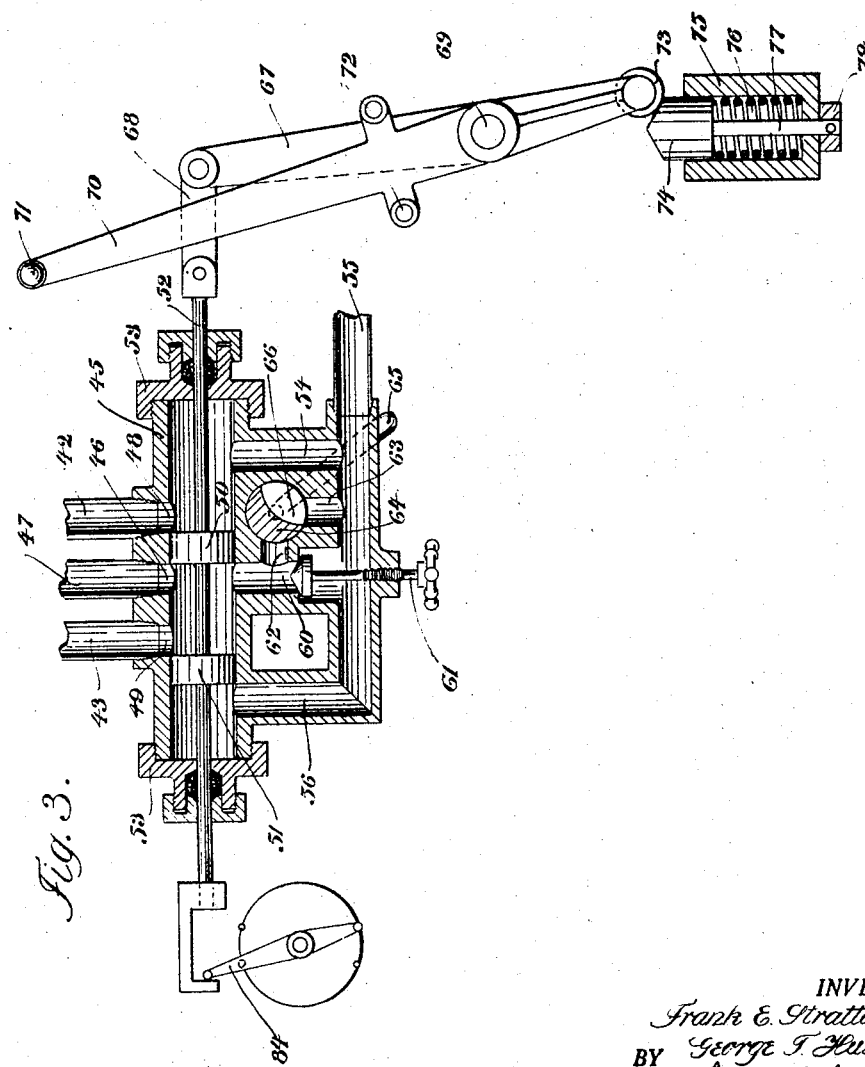
INVENTORS
Frank E. Stratton
BY George T. Huxford
Thomas A. Jenckes Jr.
ATTORNEY July 5, 1932.  G. T. HUXFORD ET AL  1,866,212
GRINDING MACHINE
Filed March 16, 1927  8 Sheets-Sheet 5
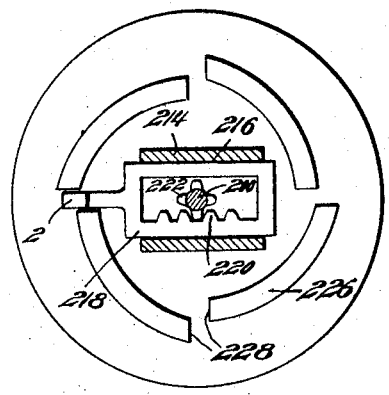
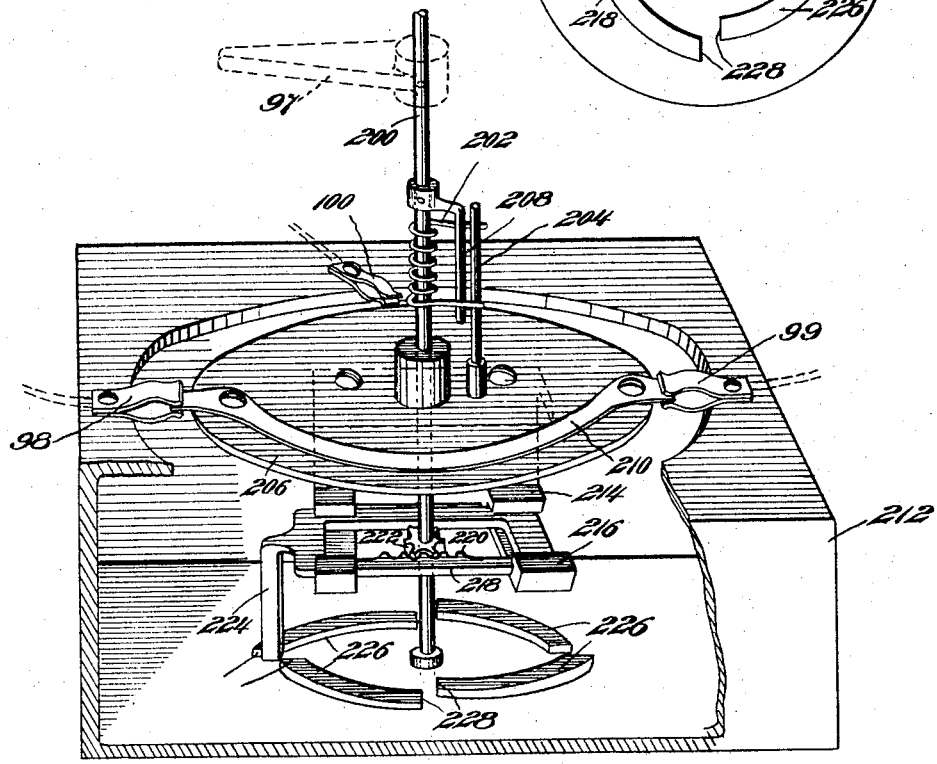
INVENTORS.
Frank E. Stratton
George T. Huxford
BY Thomas A. Jenckes Jr.
ATTORNEY July 5, 1932.  G. T. HUXFORD ET AL  1,866,212
GRINDING MACHINE
Filed March 16, 1927   8 Sheets-Sheet 6
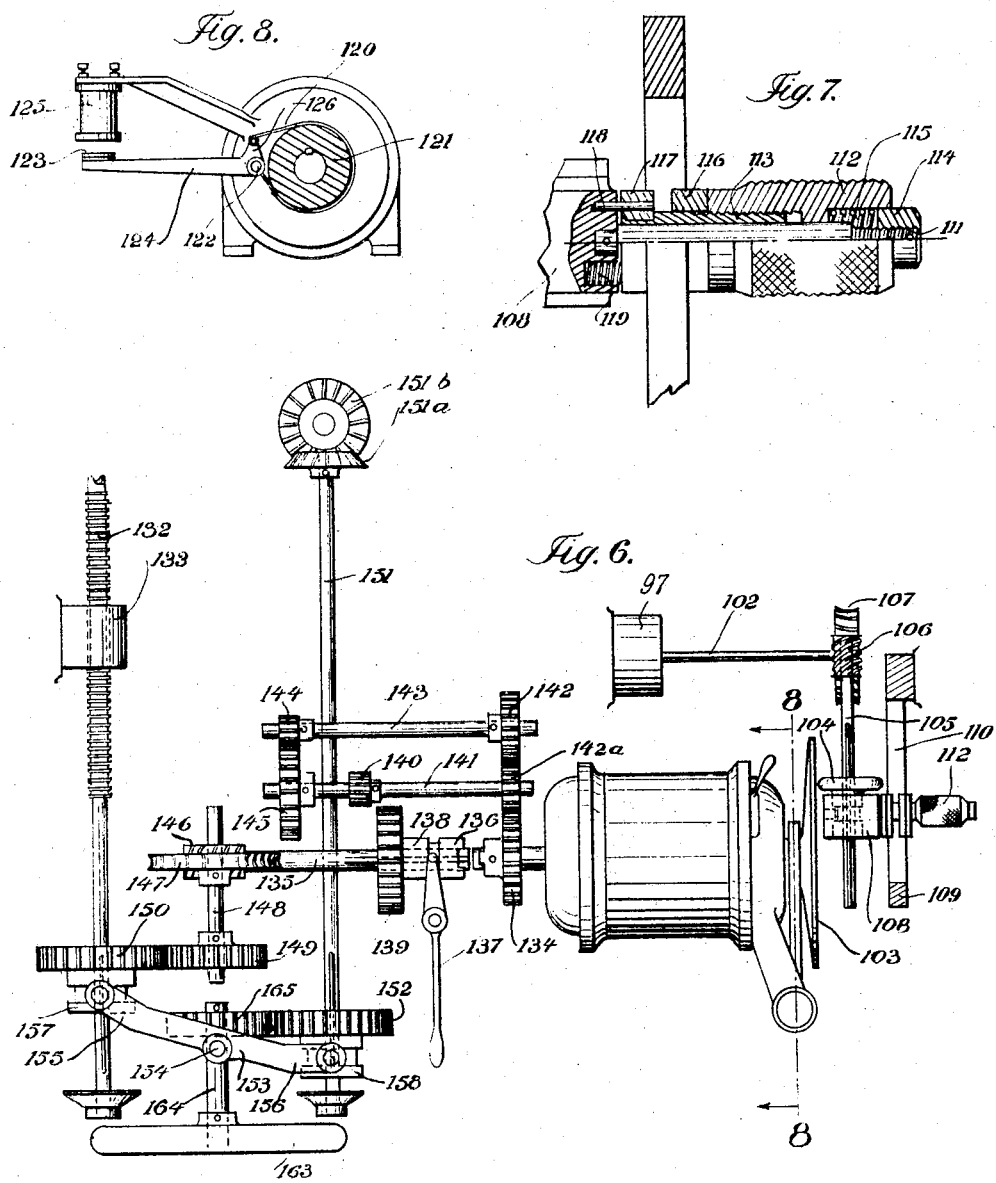
INVENTORS
Frank E. Stratton
George T. Huxford
BY Thomas A. Jenkins Jr.
ATTORNEY

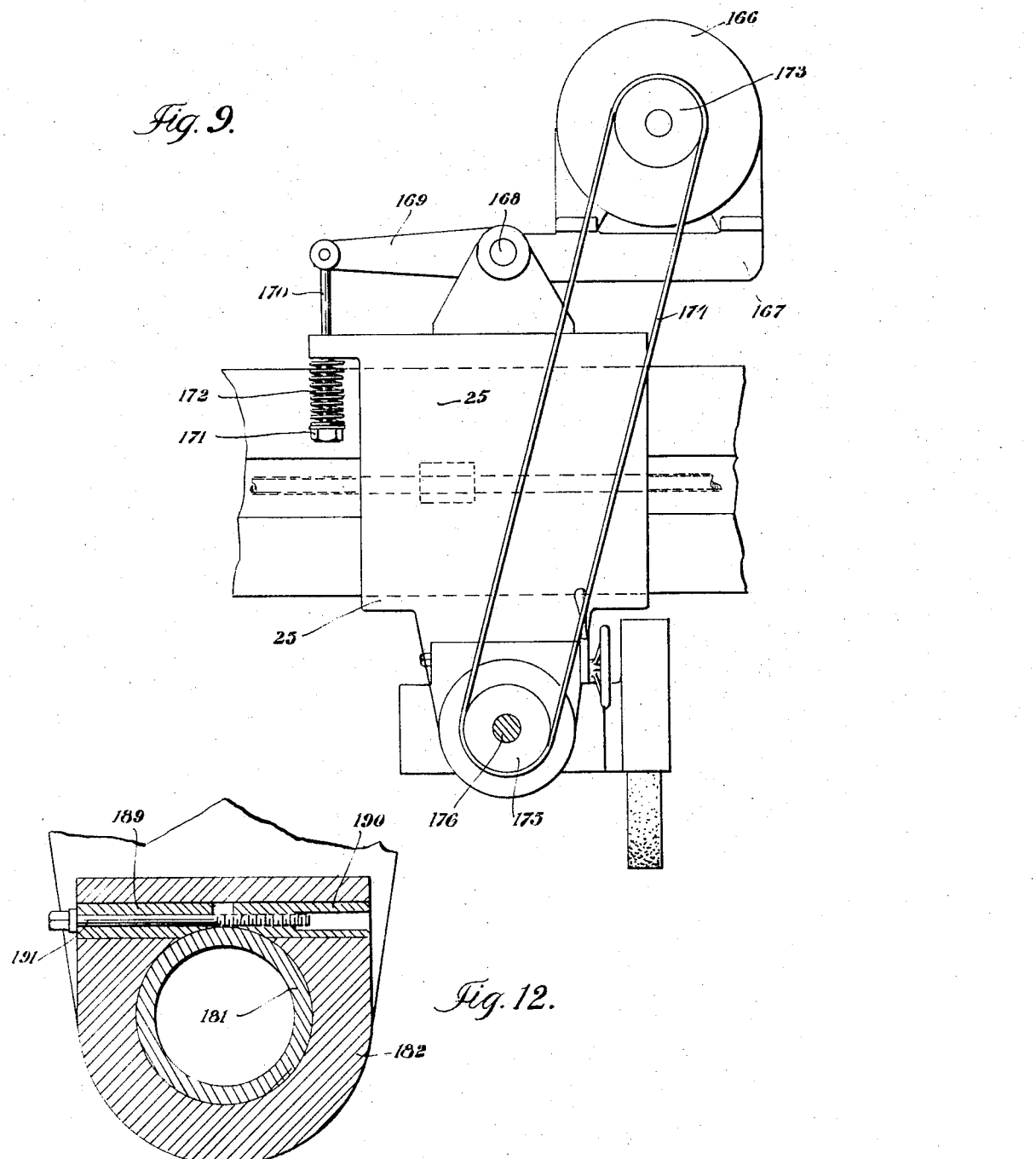

July 5, 1932.  G. T. HUXFORD ET AL  1,866,212
GRINDING MACHINE
Filed March 16, 1927   8 Sheets-Sheet 8
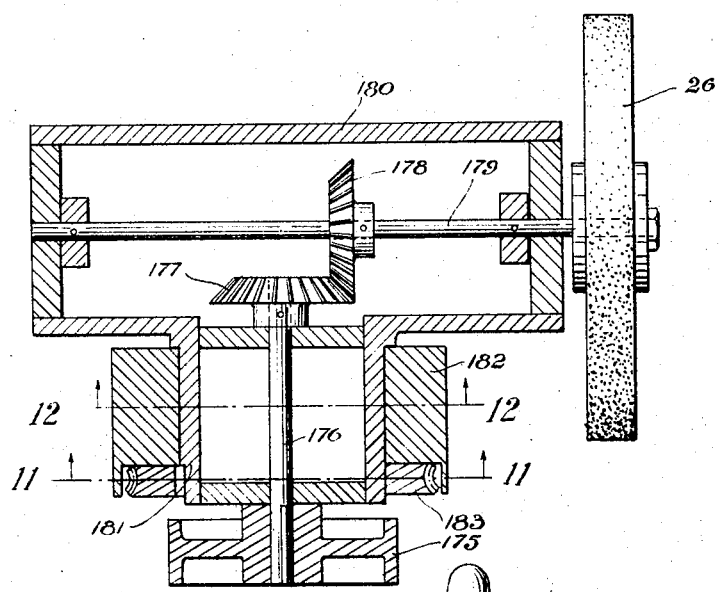
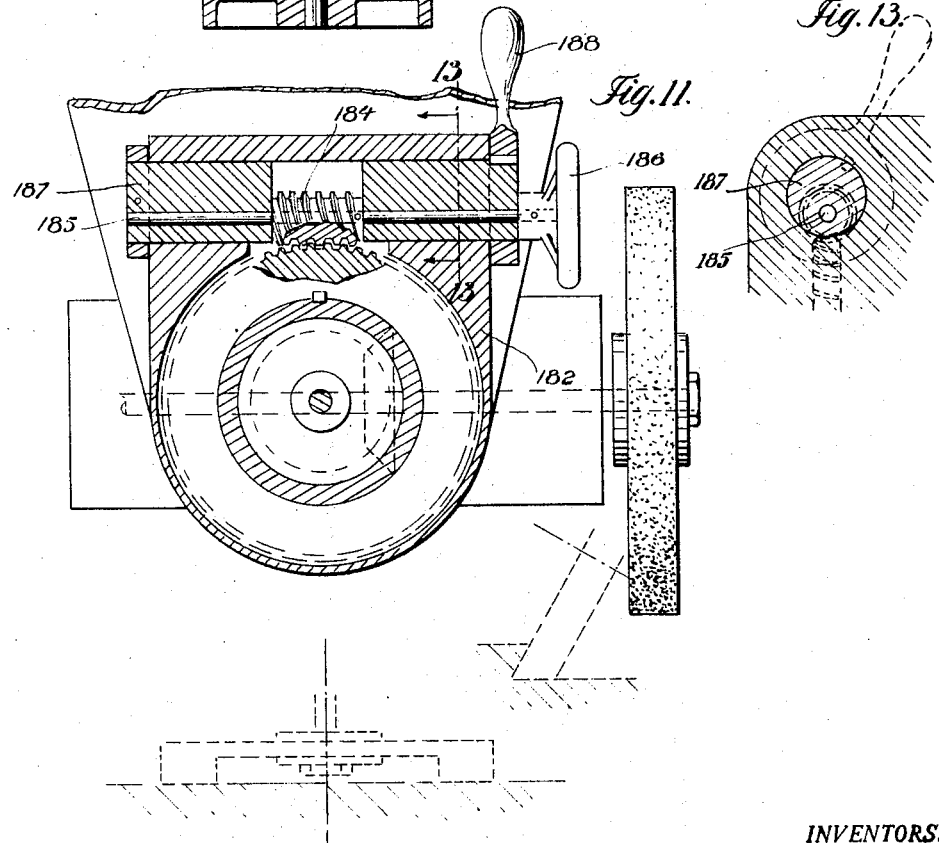
INVENTORS.
George T. Huxford
Frank E. Stratton
BY Thomas A. Jenkes Jr.
ATTORNEY Patented July 5, 1932

1,866,212

UNITED STATES PATENT OFFICE

GEORGE T. HUXFORD AND FRANK E. STRATTON, OF PROVIDENCE, RHODE ISLAND, ASSIGNORS TO BUILDERS IRON FOUNDRY, OF PROVIDENCE, RHODE ISLAND, A CORPORATION OF RHODE ISLAND

GRINDING MACHINE

Application filed March 16, 1927. Serial No. 175,850.

The present invention in its specific application relates to improvements in grinding machines but in its broader and more generic aspects the invention includes improved features that are of general application and capable of use in a large number of different classes of machines and apparatus.

In grinding machines such as have been hitherto employed and particularly those employing a reciprocating work holding table, the feeding of the grinding wheel, either transversely or vertically of the work, has usually been accomplished by mechanisms operated by hand, though occasionally it has been done mechanically.

By our invention, we provide an electrical system for feeding the grinding wheel either vertically or transversely of the work. In its preferred form, the system includes a motor for operating the feeding mechanism and this motor is controlled automatically by the table so as to be energized and operate for a certain time interval, preferably at the end of the table's stroke in either direction, thereby to feed the grinding wheel a predetermind amount at the end of each stroke. Our system while peculiarly adapted for application with grinding machines is also susceptible for use with machines and apparatus of other character and can generally be used wherever it is desired to move a member predetermined amounts during any predetermined fraction of the cycle of movement of another movable member.

In conjunction with our electrical feeding system, we provide means whereby the time intervals of operation of the motor and consequently the amounts that the grinding wheel is periodically fed may be varied and also means for transforming the intermittent energization of the motor into a continuous one so that the grinding wheel may be fed continuously with respect to the work if desired.

We prefer also to employ in combination with the electrical feed for the grinding wheel an electrical system for reciprocating the table which includes a motor and means for automatically changing the direction of its rotation at the end of the table's stroke in either direction. This combination results in a highly simplified apparatus and one in which a single source of electrical energy may be employed and in which both motors are controlled automatically preferably by a single means carried by the table.

As an alternative form of table operating means, we may employ a fluid-operated apparatus which includes a system through which is continously circulated a supply of fluid by a low-pressure unidirectional pump, preferably two cylinders with reciprocating pistons in the system for operating the table, and a valve for automatically changing the flow of the fluid from into one of the cylinders into the other so that the pistons are alternately operated in opposite directions to cause the reciprocation of the table. In its preferred form, the valve includes means for changing the quantity of fluid flowing into the cylinders thereby to change the speed of reciprocation of the table and also means for rendering its action inoperative whenever desired so as to make the fluid-operated apparatus incapable of operation and prevent reciprocation of the table.

Our invention also involves improvements in the mechanisms for transmitting the rotation of the feeding motor into motion of the grinding wheel and includes means for obtaining either a vertical or transverse automatic feed of the wheel and means for varying the amount of feed obtained. Our invention also makes provision for a hand feed of the grinding wheel which may be employed in lieu of or in addition to the automatic feed if desired.

Our invention further comprises a simplified and efficient mechanism for mounting the grinding wheel and for enabling it to be adjusted and its angle of operation changed and varied. With the above and other objects in view, the invention further resides in the details of construction and arrangements of parts more specifically pointed out in the following description of the accompanying drawings forming part of this specification and in which;

Fig. 3 is a sectional view of the valve for the hydraulic means and its operating means of the embodiment of my invention shown in Fig. 2.

Fig. 4 is an end view from the right of Fig. 3.

Fig. 5a is a perspective view partially broken away of a self-throwing electrical switch employed as the switch operative to de-energize the motor in the electrical circuit shown in Fig. 5. Fig. 5b is a reverse plan view taken from the interior of the switch box shown in Fig. 5a.

Fig. 6 is a plan view of the electrical tool feeding apparatus.

Fig. 7 is a plan view, partly in section, of a detail thereof.

Fig. 8 is a sectional view on the line 8—8 of Fig. 6, showing in addition the brake not shown therein.

Fig. 9 is an elevational view of the operating means for the grinding wheel.

Fig. 10 is a sectional plan view through the adjustable support for the grinding wheel.

Fig. 11 is a sectional elevational view on the line 11—11 of Fig. 10.

Fig. 12 is a sectional plan view on the line 12—12 of Fig. 10; and

Fig. 13 is a sectional view on line 13—13 of Fig. 11.

Figure 1:
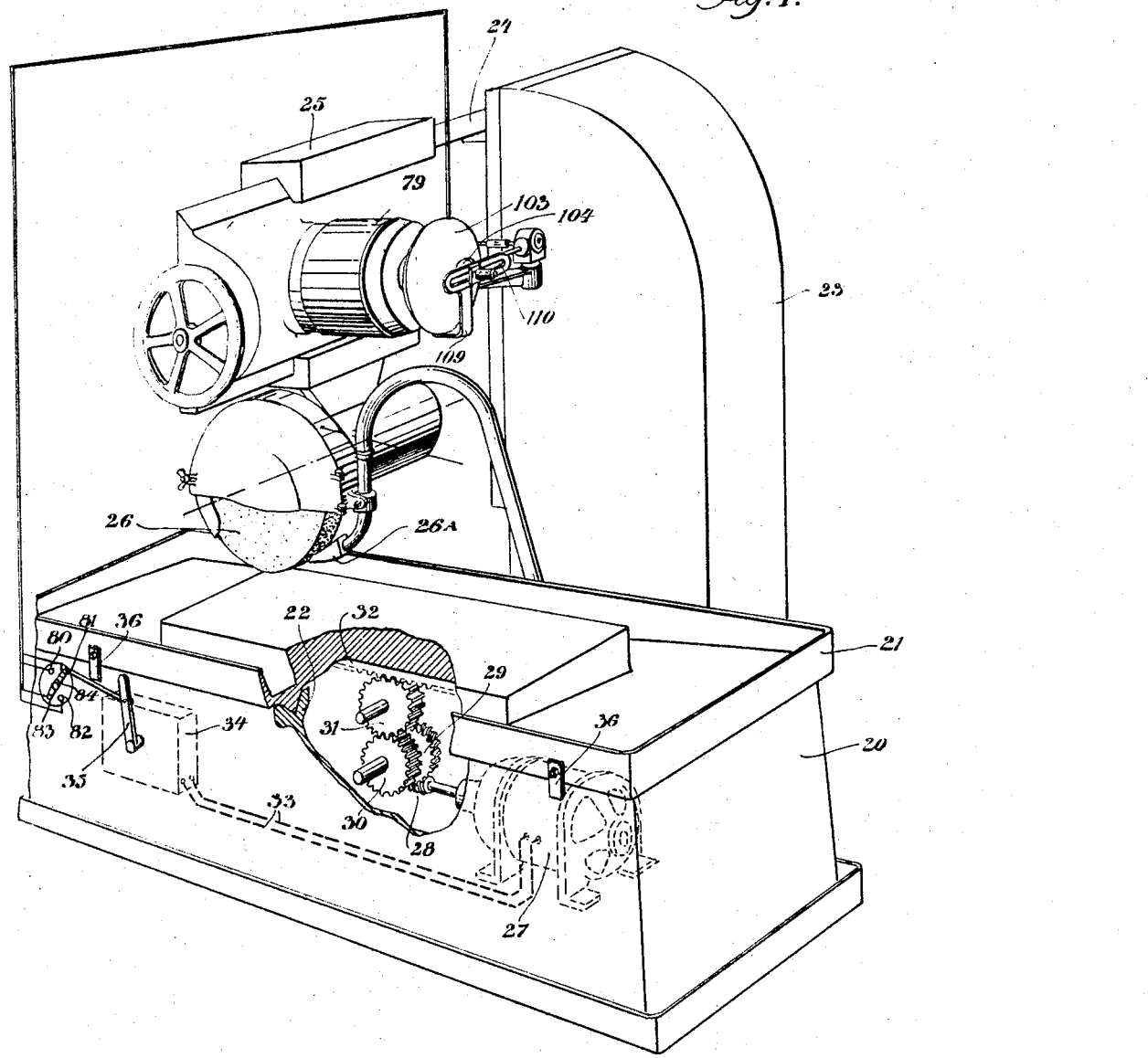
Fig. 1 is a perspective view, partly diagrammatic and partly broken away, of the preferred form of the present invention.

As shown in the drawings wherein like characters of reference indicate like parts throughout, the invention is embodied in a grinding machine which comprises, a bed, 20 and a reciprocating work holding table, 21 mounted in runways 22 on the bed. The grinding machine also includes a column 23 and a carriage 24, dove-tailed on the column and adapted for sliding vertical movement. On this carriage is dove-tailed another carriage 25 adapted for movement thereon transverse to the table. The carriage 25 serves as a support for a grinding wheel 26, of the usual construction which may be cooled by a water jet from a nozzle 26a, or by similar means.

In the embodiment of the invention shown in Fig. 1, electrically operated means are utilized for causing the reciprocation of the table. The electrically operated means preferably include a motor, 27 disposed within the bed and having a worm 28 on the free end of its shaft, the worm meshing with a gear 29, which drives a rack 32 on the underside of the table through gears 30 and 31. The direction of the motor is reversed at the end of the travel of the table in either direction and therefore a continuous reciprocation of the table is obtained by reason of the operative association of the table with the motor through the gear train above described.

The reversal of the rotation of the motor is accomplished automatically by the table itself. To this end the circuit 33, to the motor is under the control of a switch 34, which switch is of a conventional character and of the type usually employed to obtain a change in direction of the current flowing through a circuit. The switch is actuated by a lever 35, which is tripped by means such as dogs 36 carried by the table at the end of the table's travel in either direction. The direction of the current flowing through the windings of the motor is thus automatically reversed at the end of the table's travel in either direction, thereby causing a reversal of the rotation of the motor and the continuous reciprocation of the table.

Instead of employing electrically operated means for reciprocating the table, we may use fluid operated means for obtaining this result. In the prior application of Frank E. Stratton, Serial Number 8805, filed Feb. 17, 1926, he has disclosed a grinding machine in which the reciprocations of the work holding table are obtained by fluid-operated means including a reversible flow pump. In our present disclosure, we employ a unidirectional flow pump and utilize a valve operated automatically by the table for controlling the flow of the fluid to the fluid-operated means which cause the reciprocation of the table.

Figure 2:
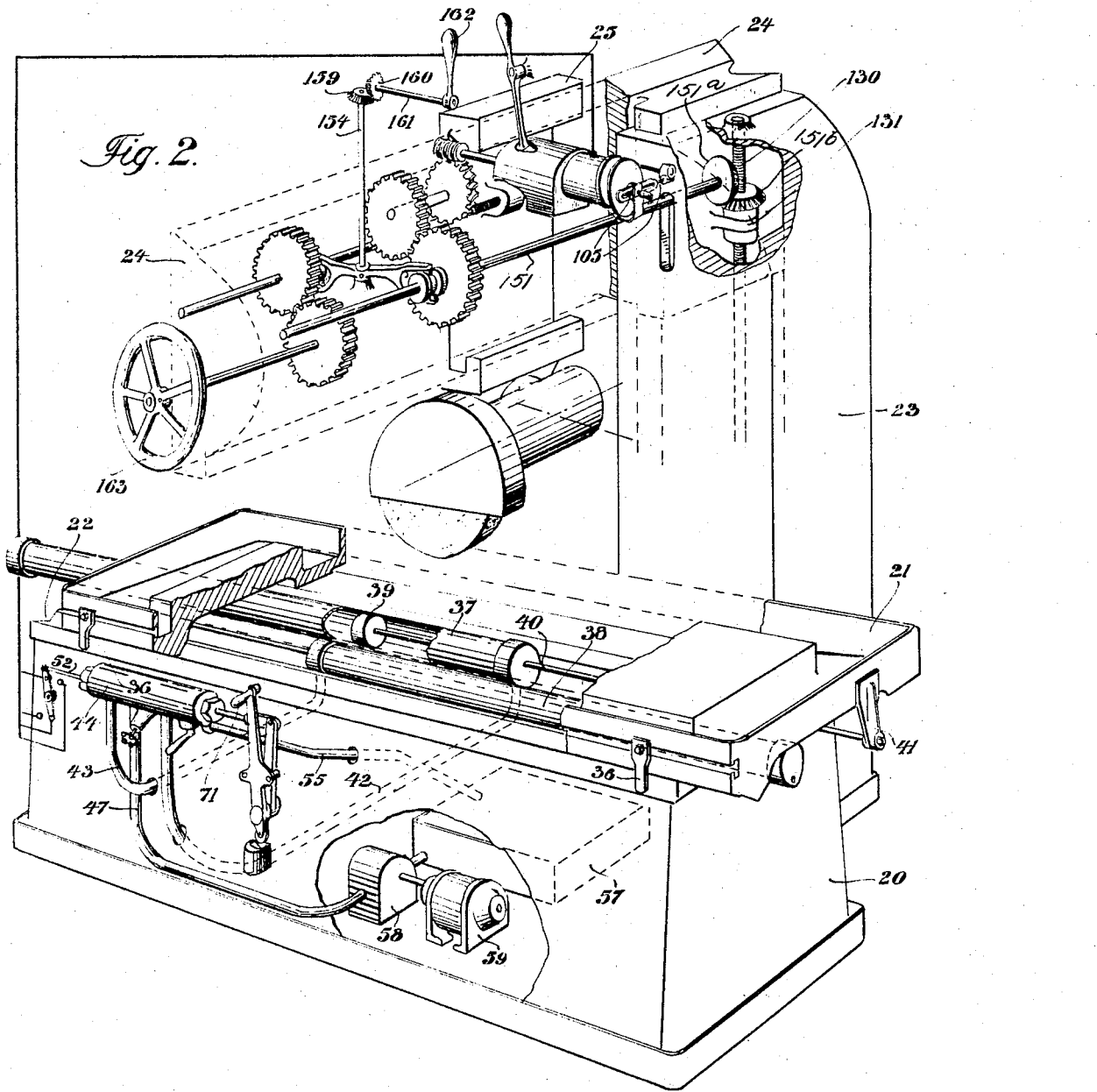
Fig. 2 is a view, similar to Fig. 1, showing details of the feeding mechanism and a hydraulic table operating means.

As best shown in Fig. 2, the fluid operated means comprise two cylinders 37 and 38 stationarily mounted in the bed of the machine. The cylinders form elements of rams and have pistons 39 mounted for reciprocation therein, the pistons having rods 40 projecting through the heads of the cylinders and attached to brackets 41 at opposite ends of the table. The fluid employed, usually water or oil is admitted to the cylinder 37 near its right hand end, as seen in Fig. 2 through a pipe 42 and is admitted to the cylinder 38 near its left hand end through a pipe 43. As above stated, we employ a valve for controlling the flow of the fluid to the cylinders and this valve so functions that, when it is desired to have the table move to the left, fluid is permitted to flow through the pipe 42, causing movement of the piston within the cylinder 37 to the left and consequently movement of the table to the left, and when it is desired to have the table move to the right, fluid is permitted to flow through the pipe 43 causing movement of the piston in the cylinder 38 and of the table to the right. The flow of the fluid through the pipes 42 and 43 is controlled by a valve 44, which is automatically operated by the table and so functions that when fluid is flowing through one of the pipes into one of the cylinders there is no flow through the other pipe into the other cylinder. Moreover, on the back or non-working stroke of each piston, the fluid which had been admitted into the cylinder containing that piston is forced out by the piston through the same pipe through which it enters the cylinder. As stated above, the valve is automatically operated by the table and this operation occurs in the embodiment shown at the end of the work's travel in either direction so that the flow of fluid into the cylinders is automatically changed from one to the other at the end of the table's travel in either direction thereby providing continuous reciprocation of the table.

The structure of the valve preferably employed is shown in Fig. 3. It includes a hollow cylinder 45 into which fluid is admitted through a port 46 from an inlet pipe 47. The fluid within the valve may flow through either of two exit ports 48 or 49 into either of the pipes 42 or 43, depending upon the position within the cylinder of the movable valve member employed. This valve member comprises two pistons 50 and 51 spaced apart and disposed on a rod 52 which projects through stuffing boxes 53 on the heads of the valve cylinder. The movement of the rod 52 causes movement of the pistons 50 and 51 within the cylinder thereby changing the flow of the fluid from within the valve through one of said pipes 42 or 43 into the other of said pipes. When the valve member is in the position shown in Fig. 3 the fluid is permitted to flow through the pipe 43 from the inlet pipe 47, but is prevented by the piston 50 from flowing into the pipe 42. On the other hand, when the pistons are moved by the rod to the right as seen in Fig. 3 so that the piston 50 is on the right hand side of the port 48 and the piston 51 between the port 46 and the port 49 the fluid from the inlet pipe 47 flows into the pipe 42, but is prevented by the piston 51 from flowing into the pipe 43. As pointed out above the exhaust fluid from the cylinder not working flows out through the same pipe through which it enters. The exhaust fluid flowing into the valve from the pipe 42 passes through a port 54 in the valve and out through the exhaust pipe 55. The exhaust fluid flowing through the pipe 43 flows out through an exhaust port 56 and also out through the pipe 55. The fluid passing through the pipe 55 is conveyed into a tank 57 within the bed of the machine as shown in Fig. 2 and from said tank it is pumped back through the pipe 47 into the valve by means of a pump 58, which is unidirectional and continuously rotated in one direction as by an electrical motor 59 or similar means.

In conjunction with the valve we provide means for changing the quantity of fluid flowing into the cylinders through the pipes 42 and 43 and consequently the speed of reciprocation of the table. As will be seen from Fig. 3 the valve includes a port 60 opposite the entrance port 46 and this port 60 communicates with the exhaust pipe 55 through a valve 61 serving to control the flow of fluid through port 60. The quantity of fluid flowing through either the pipe 42 or the pipe 43, (depending upon the position of the movable valve member within the cylinder) is controlled by means of the valve 61 inasmuch as this valve allows a certain quantity of fluid to be shunted or by-passed from the pipes 42 or 43 through the port 60 and into the exhaust pipe 55. The amount of fluid thus shunted or by-passed may be varied by the valve 61 and of course the more fluid that is shunted through the port 60, the less fluid enters the pipes 42 and 43 and the slower is the speed of reciprocation of the table. It is by manipulation of the valve 61 to control the amount of fluid passing through the port 60 that the speed of reciprocation of the table may be varied.

In the preferred form of the valve, we also provide a means for rendering its operation impossible, so that, when it is desired, the apparatus may be placed in such a position, that even though the pump is operating to circulate the fluid, there is no fluid under pressure admitted to the cylinders through the pipes 42 and 43. To this end, we provide in conjunction with the valve another by-pass for the fluid to the exhaust pipe 55 through orifices or ports 62 and 63 and the fluid flowing through these orifices is controlled by means of a rotatable valve 64 operated by a handle 65 and having a notch 66 which, when the valve is rotated clockwise, as seen in Fig. 3, permits communication between ports 62 and 63. When the valve is in the position shown in Fig. 3 communication between the ports is cut off by the valve. When the valve 64 is so turned as to establish communication between ports 62 and 63 through the notch 66 the entire flow of the fluid from the pipe 47 passes through said ports and into the exhaust pipe, and no fluid flows through the pipes 42 and 43 to actuate the pistons within the cylinders 37 and 38 and cause movement of the table.

The operation of the movable valve member to change the flow of fluid from into one of said pipes 42 and 43 into the other is obtained automatically at the end of the work's or table's travel in either direction, or at any predetermined period in the cycle of reciprocation thereof. On the right hand end of the rod 52 the end of a lever 67 is secured through a link 68 which is pivoted both to the lever and the end of the rod 52. The lever 67 is pivoted to the side of the bed of the machine at 69, and is adapted to be operated by another lever 70 also pivoted at 69. The upper end of this lever 70 has a transversely projecting portion 71 which is in the path of the dogs 36 attached to the table. At the end of the table's travel in either direction one of the dogs strikes the portion 71 and the lever 70 is tripped causing movement of the movable valve member to change the flow of the fluid from into one of the cylinders to the other. The lever 70 carries two stops 72 between which the lever 67 is disposed so that when the lever 70 is rocked by the dogs the lever 67 is caused to rock also because of the engagement of one of the stops 72 therewith and the movement of the valve member above described is obtained. The lower end of the lever 70 terminates in a roller 73 which is acted upon by a plunger 74 movable within a cylinder 75 and urged upwardly by means of a coil spring 76. The plunger has a rod 77 projecting through the bottom of the cylinder 75 and provided with a nut or similar means 78 to determine the extent of the upward movement of the plunger. It will be noted that the upper end of the plunger 74 is angularly shaped, the purpose of which is to cause a quick movement of the lever 70 when the roller 73 passes the apex of the angle thereby causing a quick operation of the lever 67 and valve when one of the dogs strikes the upper end of the lever 70.

It will be seen that we have provided a construction, whereby the flow of the fluid is changed from one cylinder to the other quickly and rapidly at the end of the table's stroke in either direction, and a fluid-operated means for reciprocating the table utilizing a unidirectional pump for continuously circulating a constant quantity of the fluid.

As previously stated, we have devised an electrical system for automatically feeding the grinding wheel either transversely or vertically of the work an adjustable predetermined amount at the end of each stroke of the work or table. While the system has particular utility when applied to a grinding or analogous machine, it is adapted also for application with many other apparatus and machines and is generally capable of use wherever a member is to be advanced or moved predetermined amounts at the ends of or at any portions of the cycles of reciprocation or movements of another movable member.

In its preferred form, the electrical feeding system includes a motor, 79 attached to the carriage 24 and to which the energizing current is conveyed through a circuit under the control of means automatically operated by the table. The controlling means embodies a switch operated at the end of each stroke of the table. In the form of the invention shown in Fig. 1, the switch has four contacts, 80, 81, 82 and 83 and a pivoted switch arm 84, which is acted upon and rocked by the dog 36 of the table, so that the arm may bridge either contacts, 80 and 82, or 81 and 83. In the modification of the invention shown in Fig. 2, the same type of switch is used and the switch arm is attached to the left hand end of the rod 52 and actuated thereby (Fig. 3). Since the valve is operated by the table, as above described, it follows that the switch arm in the latter form of the invention also is actuated by the table and at the end of each stroke thereof.

Figure 5:
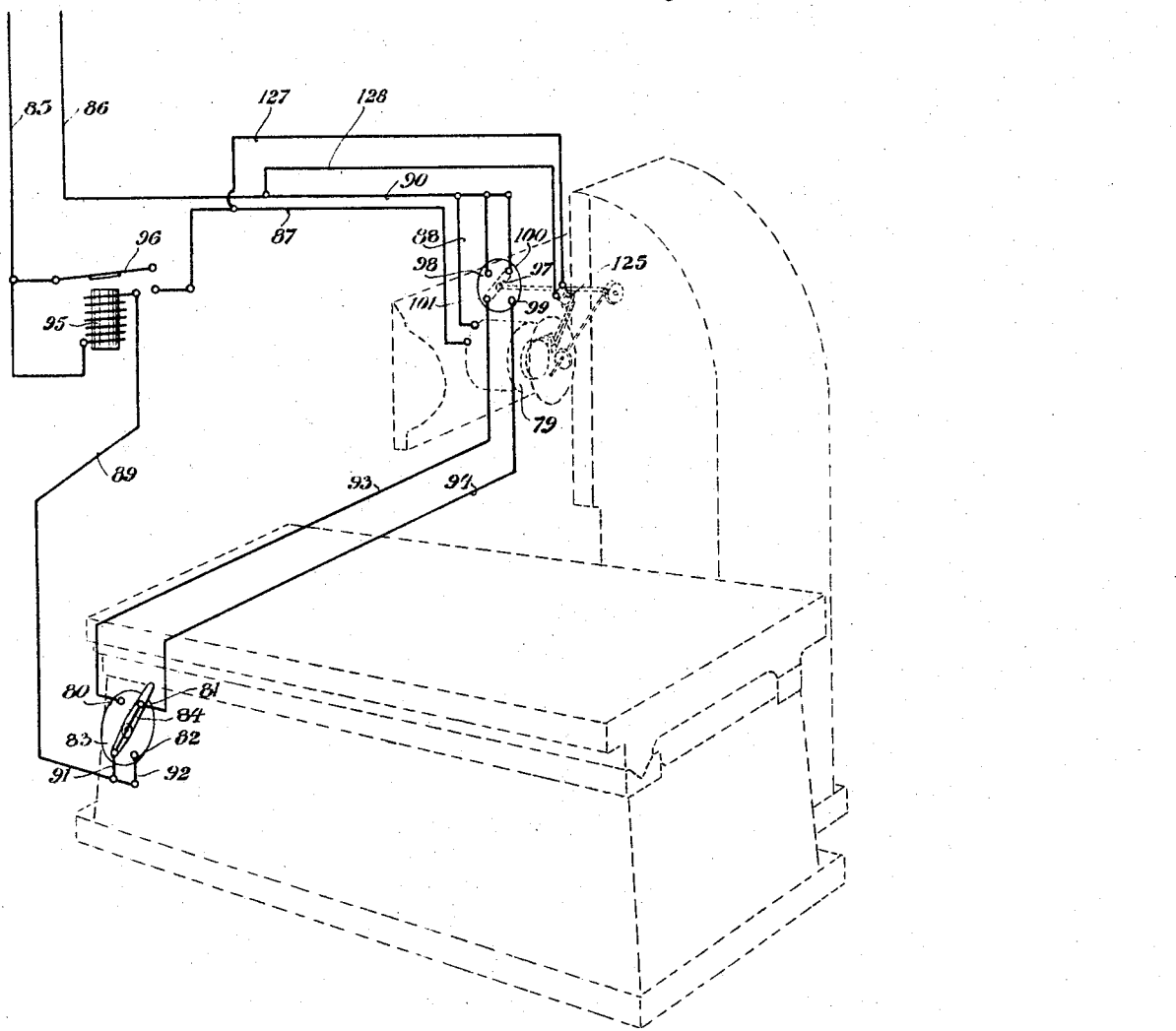
Fig. 5 is a diagrammatic view of the electrical feeding system for moving the tool.

The nature of the electrical feeding system and its mode of operation will best be understood by reference to Fig. 5. The numerals, 85 and 86 indicate the main conductors leading from the source of electrical supply. The main circuit divides into parallel branch circuits, one of which leads to the motor 79, the other of which serves as a means to control the circuit to the motor. The conductors of the motor circuit are represented by the numerals 87 and 88 while the conductors of the parallel controlling circuit are indicated by the numerals, 89 and 90. The conductor 89 is connected by the conductors 91 and 92 to both contacts 82 and 83 of the table-operated switch, while the conductor 90 divides into two branches 93 and 94 connected to the other two contacts 80 and 81 of said switch. In the circuit 89 there is an electromagnet 95, while in the circuit 87 there is a switch 96 controlled by said electromagnet. The switch 96 normally breaks the circuit to the motor, but whenever the parallel controlling circuit is completed the electromagnet is energized and attracts said switch completing the circuit to the motor.

The motor, when energized, operates the feeding mechanism for the grinding wheel. Of course, were the motor permanently energized, the feeding of the grinding wheel would be continuous and for this reason, we provide means for energizing the motor only for a short time at the end of each stroke of the work or table so that the wheel will be fed a short distance at the end of each table stroke or at any other desired predetermined time. As pointed out above, the energization of the motor occurs when the electromagnet 95 is energized to operate the switch 96 and close the motor circuit. The time of energization of the motor therefore is a function of the time that the electromagnet 95 is energized or the parallel controlling circuit completed.

The controlling circuit as above stated has two parallel circuits, 93 and 94 containing the table-operated switch, which is common to both and provided with a rotary switch arm 97, which is adapted to complete the controlling circuit either through conductors 90 and 94 across contacts 98 and 99 or through conductors 90 and 93 across contacts 100 and 101. As best shown in Fig. 6, the rotary switch arm 97 is carried on a shaft 102, which is driven by the motor through a mechanism of an adjustable character. One end of the motor shaft has a flat disc 103 against the surface of which rides a roller 104, splined to a shaft 105. When the motor and disc rotate, the roller is frictionally driven by the disc and rotates the shaft 105, which in turn rotates the shaft 102 and switch arm, 97 through a worm 106 and gear 107.

It will be noted that assuming the table-operated and motor-operated switches are in the positions shown in Fig. 5, the circuit to the motor is broken because of the fact that no current is flowing through the parallel controlling circuit and the electromagnet 95 is deenergized. When, however, the table comes to the end of its stroke the switch arm 84 is rocked thereby, so as to complete the controlling circuit across the contacts 80 and 82 and through switch arm 97 and consequently the electromagnet is energized, attracting the switch 96, which closes the circuit to the motor. The motor, therefore, operates to feed the wheel either transversely or vertically of the work. The operation of the motor and consequently the feeding of the wheel is only for a short period of time, however, because when the motor rotates, the switch arm 97 is also rotated breaking the controlling circuit across the contacts 101 and 100. The electromagnet 95 is therefore deenergized and the switch 96 breaks the circuit to the motor causing its operation to cease. When the table at the end of its return stroke rocks the contact arm 84 back into the original position to complete the circuit across contacts 81 and 83, the controlling circuit is again completed, (the arm 97 being then in the position whereby it closes the circuit across contacts 98 and 99) and a feeding of the wheel again occurs. This making and breaking of the controlling circuit occurs periodically and at the end of each stroke of the table so that the wheel is fed a certain amount at the end of each stroke of the table.

It is apparent that it is particularly desirable to employ as the switch operative to de-energize the motor after a predetermined time, a switch which will remain in set position to complete the circuits, storing up in itself sufficient energy to throw itself after a sufficient time interval when a predetermined force has been exerted thereon. While various types of such switches are well known in the market and are sold by the General Electric Company and others, we have shown in Figs. 5ª and 5ᵇ a suitable type of switch operative in either direction for this purpose. Where such a switch is to be used as the switch for shutting off the motor 79 after a predetermined time interval, it is obvious that a unidirectional switch is sufficient, but we have shown in Figs. 5ª and 5ᵇ a type of switch which will work in either direction. As shown in Figs. 5ª and 5ᵇ, the shaft 200 shown therein comprises the shaft 102 of the motor de-energizing switch, which is continuously rotated. The spring 202 surrounds the shaft 200 and has one end thereof adapted to abut the rod 204 upstanding from the rotary disk 206 and the opposite end thereof to abut the arm 208 depending from said shaft 200 parallel to said rod 204 to store up throwing energy in the spring 202 on rotation of the rod 200. Mounted on the disk 206 is a conductor strip 210 adapted to simultaneously engage the contacts 98 and 99 spaced diametrically thereof at approximate right angles to the contacts 98 and 99. In the interior of the switch case 212 and mounted on a bracket 214 depending from the disk 206 is the horizontal slideway 216 adapted to receive therein the horizontal slide 218 having a rack 220 in one side thereof adapted to engage the gear 222 on the shaft 200. The slide 218 also has an arm 224 depending vertically therefrom adapted to abut the ends of four sector shaped bars 226 arranged eccentrically to each other, so that if the arm 224 is moved outwardly or inwardly radially thereof it will be in a position to rotate 90° under the influence of the extended spring 202 to abut the adjacent end 228 of the adjacent sector depending upon the direction of rotation of shaft 200.

The operation of the switch is obvious from the above description. Assume that the shaft 200 is continuously rotated in a clockwise direction. As the disk 206 and attached rod 204 are held stationary by the arm 224 of the slide 218 contacting an end 228 of a sector 226, the rotating arm 208 depending from the shaft 200 will extend the ends of the spring 202 storing up energy therein. Simultaneously the shaft 200 will cause revolution of the gear 222 to move the rack 220 to move the slide 218 radially outwards. After a predetermined time, the arm 224 depending from said slide 218 will be moved radially outwards beyond the end 228 of the sector 226, when under the pressure of the extended spring 202, the disk 206 will rotate 90° until the arm 224 abuts the eccentric end 228 of the adjacent sector 226 thereby causing simultaneous revolution of the conductor strip 210 90° from contact with the contacts 98 and 99 into contact with the contacts 100 and 101 (not shown). On its rotation of 90°, the gear 222 remaining stationary, it is obvious that the rack 220 will be drawn radially inwardly on the rotation of the slide 218 to cause the arm 224 to abut the adjacent end 228 of the sector 226. If the shaft 200 is merely oscillating substantially 90°, it is obvious that the switch will function in a similar manner, the arm 228 being drawn radially inwardly of a sector 226 for movement in one direction and radially outwardly of a sector 226 on movement of the shaft 200 in the opposite direction.

In conjunction with the system and apparatus above described, we provide means whereby the amount that the wheel is fed may be varied and also means whereby a continuous feeding of the wheel may be obtained. In the form of the invention shown, the variation in the amounts that the wheel may be fed is obtained by varying the position of the roller 104 on the shaft 105, thereby varying the radial distance of the roller from the center of the disc 103 and consequently the speed of rotation imparted to the roller by the disc. As will be seen from Figs. 2 and 6 the shaft carrying the roller is supported in a bearing 108, the position of which may be adjusted along the shaft 105. The member 108 serves not only as a bearing for the shaft, but it also serves as a bearing for the roller so that when the position of the roller on the shaft 105 is changed the roller is caused to move with it. Therefore, the roller's position on the shaft 105 is adjusted also, its point of contact with the disc is changed and the speed imparted to it by the disc is varied.

By reference to Fig. 1 it will be noted that the motor carries a bracket 109, which has an elongated slot 110 at its upper end. The bearing 108 is supported by a shaft 111, which projects through this slot. The position of the shaft 111 in the slot may be varied thereby to vary the position of the bearing 108 on the shaft 105. As best shown in Fig. 7 the shaft is provided with a handle, 112 threaded on one end of a bushing 113 which encircles the shaft.

On the end of the shaft 111 there is threaded a nut 114 against which bears or abuts a spring 115 sunk in a well in the handle 112 and serving to urge said handle against the bracket 109, a washer element 116 being disposed between the handle 112 and the bracket 109 and loosely encircling the bushing 113. Secured to the bushing 113 and on the other side of the bracket 109 is another washer element 117, a pin 118 projecting through said washer element into the bearing 108 and serving to position the bearing 108 and to prevent the same from rotating. A set of coil springs 119 is sunk in a well in the bearing 108 and abuts against the member 117 thereby serving to urge the bearing 108 and consequently the roller 104 to the left as seen in Fig. 6 so that the roller is maintained in firm frictional engagement with the disc 103.

In order to vary the radial distance of the roller from the center of the disc it is only necessary to turn the member 112 to withdraw the roller from engagement with the disc and move the shaft 111 and the bearing 108 associated with it in the slot 110 of the bracket 109. The roller 104 moves with the bearing as above described and therefore its speed of rotation is varied and changed. If it is desired to have the feeding of the grinding wheel occur continuously, it is only necessary for the operator of the machine to move the roller 104 into the center of the disc 103, or pull it away therefrom where it will not revolve to move the switch arm 97 to shut off the motor and the controlling circuit containing the electromagnet 95 is not broken and consequently the electromagnet is continuously energized and the motor circuit continuously completed, causing the motor to continuously feed the wheel. It will be understood that when the member 112 is pulled out by the operator, the shaft 111 moves outward with it also carrying the bearing 108 and the roller 104 with it, the spring 119 permitting this movement of the bearing and roller. As soon as the operator lets go of the handle 112, the spring 119 urges the bearing 108 to the left, as seen in Figs. 6 and 7, and the roller 104 into firm engagement with the disc 103.

In the operation of the mechanism it has been found necessary to provide means for stopping the rotation of the motor as soon as it is deenergized, otherwise the feeding of the wheel would go on to a greater amount than desired.

The means for performing this function comprises an electromagnetically operated brake, the character of which is best indicated in Fig. 8. It comprises a band 120 encircling a pulley 121 on the motor shaft. The band 120 is adapted to be tightened or loosened depending upon whether the motor is stopped or rotating. The means for tightening or loosening the band 120 comprises a bell-crank pivoted at 122 and carrying a contact button 123 on the end of its long arm 124, the contact button being operated upon by an electromagnet 125 supported on the motor casing. One end of the band 120 is attached near the pivot of the bell-crank and the other end is attached to the end of the short arm 126, so that the weight of the long arm 104 tends to pull the band 120 tight. As best shown in Fig. 5 the electromagnet 125 is placed in a circuit comprising the conductors 127 and 128 connected in parallel relation with the motor and in such a way as to be energized whenever the motor circuit is energized and the motor is operated. Under normal conditions and whenever the motor is not energized, the electromagnet 124 is deenergized and does not attract the contact button 123 and the band 120 is tight upon the pulley 121. Whenever the motor is energized, however, and the circuit of the electromagnet energized, the contact button 123 is attracted by the electromagnet 125 and the belt 120 loosened on the pulley 121. We have therefore provided a friction brake for retarding the operation of the motor, which is effective only when the motor is deenergized and serves to stop the rotation of the motor instantly upon deenergization thereof while not interfering with the motor's operation when energized.

The mechanisms for communicating the motion of the motor into feeding motion of the grinding wheel are situated within the carriage 24 and are shown in Figs. 2 and 6. The vertical feed for the grinding wheel is obtained by moving the carriage 24 vertically which causes also a vertical movement of the carriage 25 carrying the wheel. This vertical movement of the carriage 24 is obtained by means of a screw 130 vertically disposed in the column 23 and extending through an offset portion 131 of the carriage 24. Said screw is operatively connected to the shaft 151 by the bevel gear 151$^a$ secured to the inner end of the shaft 151 meshing with the bevel gear 151$^b$ threadedly engaged with the stationary screw 130 and secured to said off-set portion 131 of the carriage 24 by means of a sleeve depending integrally from said gear 151$^b$ having a groove therein adapted to secure the hub 131 of the carriage 24, so that vertical movement of said gear 151$^b$ will cause corresponding vertical movement of said carriage. Whenever the gear 151$^b$ is rotated by movement of the shaft 151 it causes vertical movement either up or down (depending upon the direction of the rotation of the gear) of the hub portion 131 encircling it and since this hub portion 131 is attached to the carriage 24 of the rotation of the bevel gear 151$^b$ imparts a vertical movement to said carriage. Similarly the transverse feeding of the grinding wheel is obtained by moving the carriage 25. The movement of the carriage 25 is also obtained by means of a screw 132 which extends through a portion 133 of the carriage, as best shown in Fig. 6. Rotation of the screw 132 serves to move the member 133 and consequently the carriage 25 transversely on the carriage 24, the direction of the transverse movement depending upon the direction of the rotation of the screw 132.

The rotation of the motor may be communicated either to the shaft 151 or screw 132 and a clutch is employed and used in conjunction with gearing for coupling the motor to either of said members. As shown in Fig. 6, the left end of the motor shaft carries a gear 134 which is adapted to drive shaft 135 directly when a clutch 136 is thrown by a lever 137 so as to operatively connect the shaft 135 to the motor shaft. The collar 138 forming part of the clutch carries another gear 139, which when the lever 137 is thrown to its other operative position, meshes with a gear 140 on a countershaft 141. In this case the rotation of the motor is imparted to the shaft 135 through a gear 142 meshing through an idler 142$^a$ loosely mounted on shaft 141 which in turn meshes with the gear 134 on the motor shaft and keyed on another countershaft 143, the rotation of the countershaft 143, being communicated to the shaft 141 thence to the shaft 135 through gears 144 and 145 and gears 140 and 139. By means of this construction the shaft 135 may be driven by the motor at two speeds either by direct coupling or through the gear train above described, which provides a lower speed for the shaft 135. On the end of the shaft 135 there is a worm 146, which meshes with a gear 147 on a shaft 148 carrying another gear 149. The rotation of this last gear may be communicated either to the bevel gear 151$^b$ or to the screw 132. The shaft carrying the screw 132 has a gear 150 slidably disposed upon it and this gear 150 may be thrown into or out of mesh with the gear 149. When the gear 150 is thrown into mesh with the gear 149, (which position is shown in Fig. 6) it is driven by the gear 149 and the screw 132 is also driven and caused to rotate to feed the grinding wheel transversely. Rotation is imparted to the gear 151$^b$ from the gear 151$^a$ fast on the shaft 151 and this shaft 151 also carries a gear 152 slidably disposed thereon and which may be caused to mesh or unmesh with the gear 149. When the gear 152 is thrown into mesh with the gear 149 the gear 151$^b$ is rotated causing the vertical feeding of the wheel but when the gear 152 is thrown out of mesh with the gear 149 there is no rotation of the gear 151$^b$ and no vertical feeding of the wheel.

A single means is employed for simultaneously shifting the positions of the gears 150 and 152. As will be seen from Fig. 6, the means include a lever 153 pivoted on a shaft 154 and terminating at both ends in forks 155 and 156 adapted to engage in circular grooves in collars 157 and 158, secured respectively to the gears 150 and 152. The upper end of the shaft 154 is provided with a bevel gear 159 driven by a bevel gear 160 on a small shaft 161 adapted to be rocked or oscillated by means of a lever 162 under the control of the operator of the machine. By rocking or oscillating the lever 162 the lever 153 may be also caused to oscillate thereby simultaneously shifting the gears 150 and 152 to cause one or the other of said gears to mesh with the gear 149 and obtain either a vertical or transverse feeding of the wheel depending upon which of the gears is in mesh.

We also provide a means for feeding the wheel by hand, which in the form of the invention shown, includes a hand wheel 163 on a shaft 164 having a gear 165. Either of the gears 150 and 152 may be caused to mesh with this gear 165 upon manipulation of the hand lever 162 and therefore either transverse or vertical feeding of the wheel may be obtained by hand. By means of our construction also power means for feeding the wheel in one direction are obtained while hand operated means are available for feeding the wheel in the other direction.

It will be understood, of course, that when the hand feed is employed, the motor is disconnected from the gear 151ᵇ or screw 132 by throwing the clutch lever 137 into neutral position (which is the position shown in Fig. 6) in which position the motor has no connection with the shaft 135 whatsoever and does not drive either the gear 151ᵇ or the screw 132.

The grinding wheel is continuously driven at a constant speed and for this purpose, we employ an electric motor 166 supported on a platform 167 pivoted at 168 on the top of the carriage 25. The platform has associated with it a lever arm 169 to the end of which is attached a rod 170 projecting through a portion of the carriage 25 and terminating in a nut 171. A coil spring encircles the rod 170 and bears against the nut 171 and a portion of the carriage 25 so as to continuously urge the rod 170 in a downward direction as seen in Fig. 9 and to counterbalance the weight of the motor 166. The motor is provided with a pulley 173 which drives through a belt 174 another pulley 175 on a shaft 176. The belt is always maintained under tension by reason of the fact that the motor and pulley 173 are urged upwardly by spring 172. As best shown in Fig. 10 the end of the shaft 176 terminates in a bevel gear 177, which meshes with another bevel gear 178 on a shaft 179 to which the grinding wheel 26 is attached.

In our apparatus, we provide means for adjusting the position of the grinding wheel and also means for changing the angle that it bears with relation to the work. The shafts 176 and 179 as well as the bevel gears 177 and 178 are enclosed within a housing comprising a cylindrical portion 180 and another cylindrical portion 181 perpendicular thereon. The cylindrical portion 181 extends through a bearing member 182. The portion 181 may be rotated within the member 182 so as to change the angle of the grinding wheel 26 with relation to the work and also the member 182 may be vertically adjusted so as to adjust the vertical position of the grinding wheel. As will be seen from Fig. 11, the cylindrical portion 181 has a gear 183 encircling it and this gear may be rotated to cause the rotation of the member 181 by a worm 184, which meshes with the gear 183. The end of the worm shaft 185 has a hand wheel 186 by means of which said shaft and worm may be rotated. Loosely surrounding the shaft 185 and eccentric therewith is a cylindrical member 187 extending transversely through the bearing member 182. This cylindrical member has keyed thereto a handle 188, which may be rotated to cause the rotation of the cylindrical member around the shaft 185 as an axis. The cylindrical member 187 serves as a support for the shaft 185 so that when it is rotated around the shaft 185 it acts like an eccentric and raises it up to withdraw the worm 184 mounted thereon from being in mesh with the gear 183, so that the portion 180 and grinding wheel may be readily manually moved for large adjustments thereof. Small adjustments of the position of the wheel may be made by turning the handwheel 186 when the eccentric member 187 is moved by means of the handle 188 to lower the shaft 182 to bring the worm 184 thereon in mesh with the gear 183.

It will be thus seen that we have provided a mechanism, which is very compact and easily operated for adjusting the position of the grinding wheel angularly. The grinding wheel may be caused to act upon the work at any angle whatsoever, and various positions it may assume in operation are indicated in Fig. 11.

In conjunction with this mechanism, we provide means to tighten or loosen the cylindrical member 181 with respect to the bearing member 182, so that it may be rotated easily within it and also when adjusted to the desired position it may be tightened so as to assure that it will not move while in operation. In the preferred form of the invention this means include two sliding bolts 189 and 190, which extend through a portion of the bearing 182 as shown in Fig. 12 and are adapted to be drawn together or moved apart by means of the threaded bolt 191. The nuts are curved in conformity with the cylindrical member 181 and when drawn together they clamp it tightly in position and when moved apart they allow it free rotation within the bearing member 182 so that its position may be readily changed.

Many alterations and variations may be made in the above described structure without departing from the spirit of the invention and we desire to be limited only by the state of the prior art and the scope of the appended claims.

We claim:

1. A machine of the class described for grinding flat surfaces comprising a table for holding work, means for reciprocating said table, a tool mounted on said machine independently of the reciprocating table to contact the flat surface of the reciprocating work, an electric motor for feeding the tool at right angles to the direction of table reciprocation, a circuit for energizing the motor, a switch in the circuit normally breaking the same, another circuit normally broken, an electromagnet in the second circuit for operating the switch, means automatically operated at predetermined time intervals in the cycle of the table reciprocation for completing the second circuit to cause the energization of the motor, and means operated by the motor after predetermined time intervals of energization for breaking said second circuit.

2. A machine of the class described for grinding flat surfaces, comprising a table for holding work, means for reciprocating said table, a tool mounted on said machine independently of the reciprocating table to contact the flat surface of the reciprocating work, an electric motor for feeding the tool at right angles to the direction of table reciprocation, means automatically controlled by the table for energizing the motor at predetermined time intervals in the cycle of the table reciprocation, and means operated by the motor after predetermined time intervals of energization for causing its deenergization.

3. A machine of the class described comprising a table for holding work, means for reciprocating said table, a tool in operative relation to said work, an electric motor for feeding the tool, a circuit for energizing the motor, another circuit normally broken, for controlling the first circuit, means automatically operated at predetermined time intervals in the cycle of table reciprocation for completing the second circuit to cause energization of the motor, a switch in the second circuit, and means operated by the motor for actuating the switch to break the second circuit after predetermined time intervals of energization of the motor, said means including a disc rotated by the motor and a roller bearing against the disc and adjustable radially with respect thereto.

4. A machine of the class described comprising a member, means for imparting motion thereto another member movable relative to the first member, operating means for the second member, said operating means including a rotating disc and a roller bearing against the disc and radially adjustable with respect thereto, and means automatically operated for predetermined time periods at intervals of movement of the first member for starting and stopping the operating means whereby radial movement of the said roller on said disk may vary the length of the periods of movement of said second member.

5. A machine of the class described for grinding flat surfaces comprising a table for holding work, means for reciprocating the table, a tool mounted on said machine independently of the reciprocating table to contact the flat surface of the reciprocating work, an electric motor for feeding the tool at right angles to the direction of table reciprocation, a normally broken circuit for the motor, a friction brake for the motor, said friction brake being operative when the motor is deenergized, an electromagnet for rendering the brake inoperative, a circuit for the electromagnet connected in parallel to said motor circuit, and means automatically operated by the table at periods in the reciprocation thereof for completing the motor circuit to cause simultaneous energization of the motor and of the electromagnet.

6. A machine of the class described for grinding flat surfaces comprising a table for holding work, fluid operated means for reciprocating the table, a valve for controlling the flow of fluid thereto, a tool mounted on said machine independently of the reciprocating table to contact the flat surface of the reciprocating work, electrical means for feeding the tool at right angles to the direction of table reciprocation, predetermined amounts relative to the work, and means automatically operated by the table for simultaneously operating the valve and electrical means at the ends of the table's strokes.

7. A machine of the class described comprising a table for holding work, means for reciprocating the table, a tool in operative relation to the work, means for feeding the tool transversely of the work, means for feeding the tool vertically of the work, means for automatically actuating the feeding means at predetermined periods in the cycle of table reciprocation, and means for alternately coupling the automatic operating means to either feeding means.

8. A machine of the class described comprising a table for holding work, means for reciprocating the table, a tool in operative relation to the work, a screw for feeding the tool vertically of the work, a screw for feeding the tool transversely of the work and means for rotating the screws, said means including a gear, rotating means therefor, gears operatively associated with the screws, and means for alternately throwing said last-named gears into and out of mesh with the first gear.

9. A machine of the class described comprising a grinding wheel, means for supporting the grinding wheel, said means including a cylindrical member rigidly connected to the grinding wheel, a bearing for the cylindrical member, a gear on the cylindrical member, a worm meshing therewith, a shaft for the worm extending through the bearing, a cylindrical member loosely encircling the shaft, and eccentrically disposed thereon, means for rotating the eccentric cylindrical member to raise the worm shaft out of engagement with the gear on the cylindrical member for independent rotation of the cylindrical member and hence grinding wheel, and means for rotating the worm shaft.

In testimony whereof we affix our signatures.

GEORGE T. HUXFORD.
FRANK E. STRATTON.